United States Patent
Yoshimoto

(10) Patent No.: US 6,458,228 B1
(45) Date of Patent: Oct. 1, 2002

(54) METHOD AND APPARATUS FOR CONTROLLING WELDING TEMPERATURE OF WRAPPING MATERIAL

(75) Inventor: Hiroshi Yoshimoto, Hiroshima (JP)

(73) Assignee: Furukawa Mfg. Co., Ltd. (JP)

( * ) Notice: Subject to any disclaimer, the term of this patent is extended or adjusted under 35 U.S.C. 154(b) by 8 days.

(21) Appl. No.: 09/806,182

(22) PCT Filed: Jul. 31, 2000

(86) PCT No.: PCT/JP00/05157

§ 371 (c)(1),
(2), (4) Date: May 8, 2001

(87) PCT Pub. No.: WO01/08980

PCT Pub. Date: Feb. 8, 2001

(30) Foreign Application Priority Data

Aug. 2, 1999 (JP) .......................................... 11-218245

(51) Int. Cl.[7] .............................................. B32B 31/00
(52) U.S. Cl. ...................... 156/64; 156/73.1; 156/359; 156/580.1
(58) Field of Search ........................ 156/64, 73.1, 359, 156/580.1, 580.2

(56) References Cited

U.S. PATENT DOCUMENTS

| | | | |
|---|---|---|---|
| 4,726,168 A | 2/1988 | Seko | 53/450 |
| 4,909,018 A | 3/1990 | Yamamoto | 53/450 |
| 5,435,863 A * | 7/1995 | Frantz | 156/64 |
| 5,689,942 A | 11/1997 | Suga | 53/550 |
| 5,846,377 A * | 12/1998 | Frantz et al. | 156/359 |
| 5,855,706 A * | 1/1999 | Grewell | 156/64 |

FOREIGN PATENT DOCUMENTS

| | | |
|---|---|---|
| DE | 198 13 311 A1 | 10/1998 |
| EP | 0 230 137 A1 | 7/1987 |
| EP | 0 836 996 A1 | 4/1998 |
| JP | 63315223 A | 12/1988 |

\* cited by examiner

*Primary Examiner*—James Sells
(74) *Attorney, Agent, or Firm*—Mark Kusner; Michael A. Jaffe

(57) ABSTRACT

A hammer (14) coupled to an ultrasonic vibrator (15) is actuated to apply vibrations to a wrapping material (10) with irregularities in composition and thickness so that the wrapping material (10) can be fusion-bonded with uniform strength. The surface temperature of the wrapping material (10) measured by an infrared sensor (30) is sent to a control unit (22), and a controller (23) sends a control signal (24) to a variable-voltage source (25). The variable-voltage source (25) controls the amplitude of vibrations of the hammer (14) by temperature feedback to make uniform the generation of heat in the wrapping material (10).

2 Claims, 3 Drawing Sheets

METHOD AND APPARATUS FOR CONTROLLING WELDING TEMPERATURE OF WRAPPING MATERIAL

TECHNICAL FIELD

The present invention relates to sealing means for fusion-bonding an overlapped part of a wrapping material by using an ultrasonic vibrator which utilizes an oscillator and circuit resonance, more particularly to a method and apparatus for controlling a sealing temperature according to changes in thickness and properties of the wrapping material.

BACKGROUND ART

When there are changes in the thickness and properties of a wrapping material to be ultrasonically fusion-bonded, suitable bonding results cannot be achieved if heat generation is not commensurate with the thickness and material properties of the wrapping material, so that an ordinary ultrasonic sealing apparatus comprises means for manually adjusting the generated temperature by changing its frequency in order to deal with the changes in thickness and properties of the material. However, from a microscopic viewpoint, overall thickness of a wrapping material is not uniform due to processing errors, and there are also localized irregularities of properties in the wrapping material. It is thus physically impossible to properly manipulate the above-mentioned manual temperature adjustment apparatus relative irregularities of thickness and properties of the wrapping material which is moving at a fixed speed, posing a problem that fusion-bond irregularities appear in the wrapping material.

DISCLOSURE OF THE INVENTION

Accordingly, the present invention provides, as a method for fusion-bonding a wrapping material at a suitable temperature, a method for controlling fusion-bonding temperature of a wrapping material, comprising the steps of: in ultrasonic sealing means comprising a wrapping material and a sealing hammer that are in relative motion, an ultrasonic vibrator which actuates the sealing hammer and applies an impact to the wrapping material via the sealing hammer, and an electric circuit for applying oscillating power to the ultrasonic vibrator; measuring by a non-contact-type temperature sensor, in the vicinity of the sealing hammer, the fusion-bonding temperature of the wrapping material which is heated by continuous impacts of the sealing hammer; sending, to a variable-voltage device interposed in the electric circuit, output signals corresponding to measured temperatures being successively inputted to a control unit from the temperature sensor; and controlling, with the variable-voltage device, an amplitude of the moveable hammer in accordance with the measured temperature value, so as to make uniform the heating temperature of the wrapping material.

Further, an apparatus for implementing the above-mentioned method comprises: in which ultrasonic sealing means comprises a wrapping material and a sealing hammer that are in relative motion, an ultrasonic vibrator which actuates the sealing hammer and applies an impact to the wrapping material via the sealing hammer, and an electric circuit for applying oscillating power to the ultrasonic vibrator; a non-contact-type temperature sensor for measuring, in the vicinity of the sealing hammer, the fusion-bonding temperature of the wrapping material which is heated by continuous impacts of the sealing hammer; a control unit for continuously computing output signals for control corresponding to the temperature values measured by the temperature sensor; and means for sending output signals from the control unit to a variable-voltage device interposed in the electric circuit, and controlling an amplitude of the moveable hammer with the variable-voltage device, so as to make uniform the heating temperature of the wrapping material.

According to a conventional constitution, when the moveable hammer has a fixed amplitude, as the thickness of a wrapping material changes, the impact force on the wrapping material also changes, so that there arises a change in generated temperature. In addition, when there are irregularities in material properties of the wrapping material, the generated temperature changes in accordance with the irregularities thereof, so that the wrapping material cannot be fusion-bonded with uniform strength. However, according to the above-mentioned constitution, the generated temperature of a wrapping material is monitored and the amplitude of a moveable hammer is controlled so as to make the generated temperature uniform.

BEST MODE FOR CARRYING OUT THE INVENTION

Figure 1:
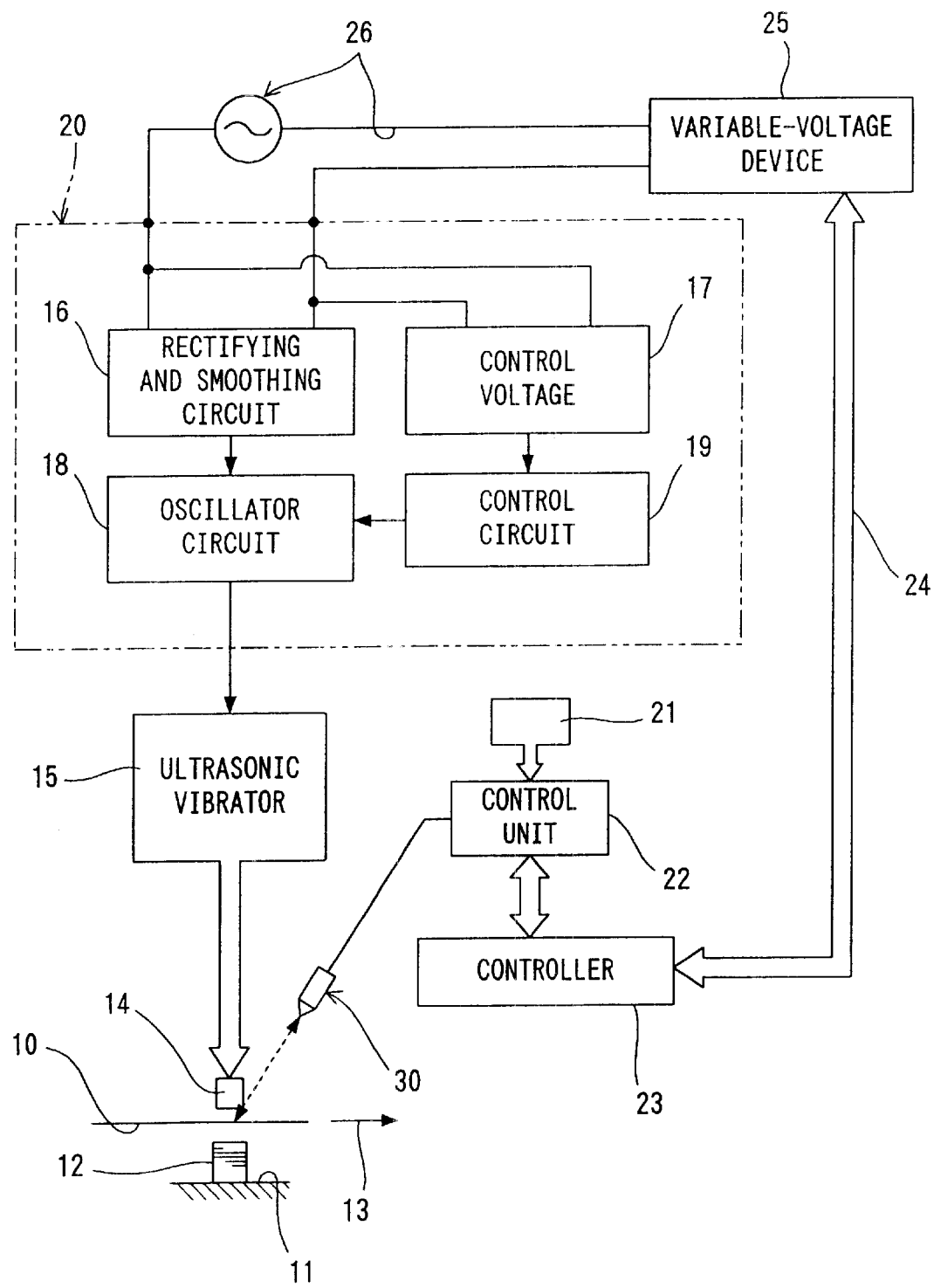
FIG. 1 is a diagram illustrating an entirety of an apparatus of the present invention.
Figure 2:
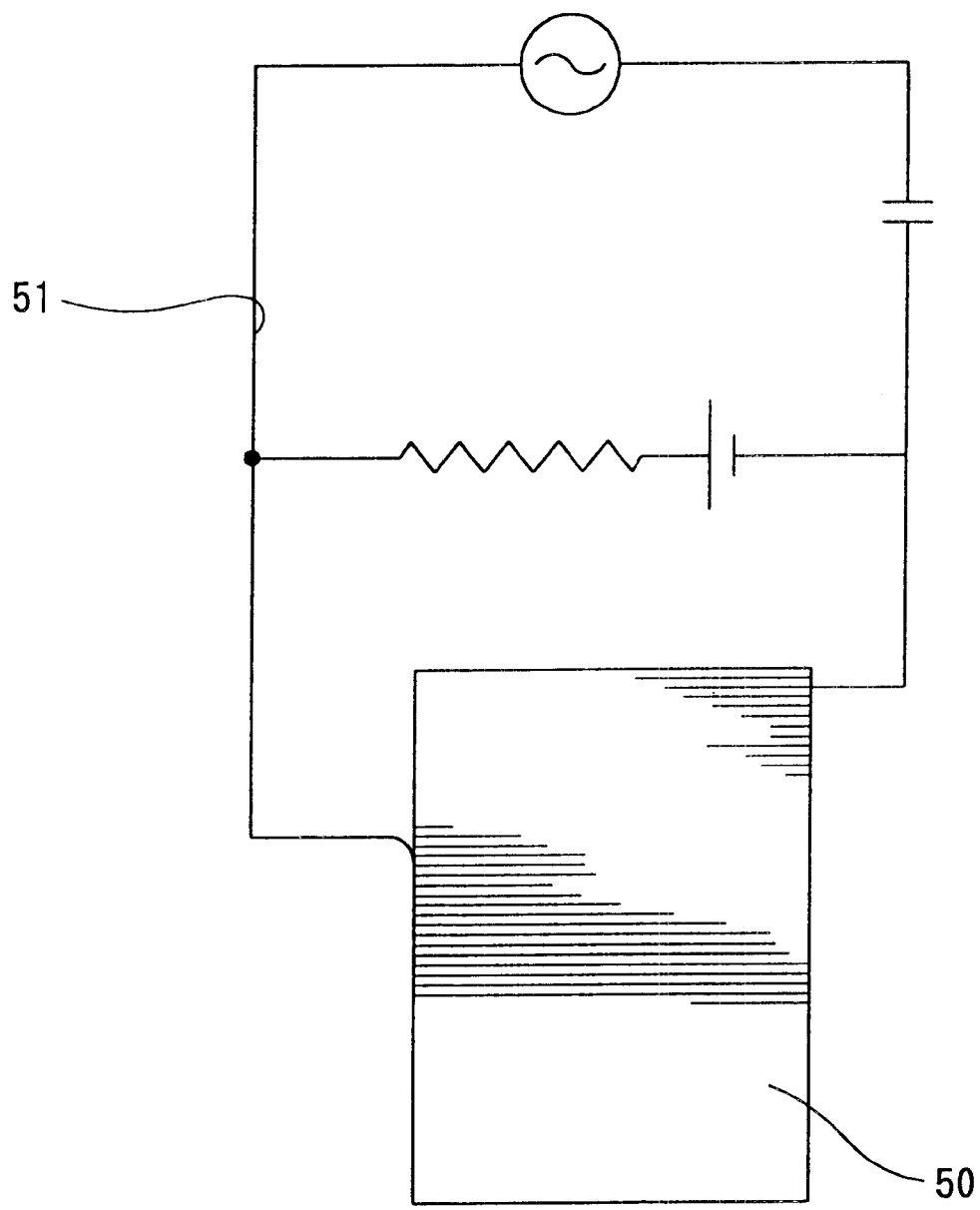
FIG. 2 is a diagram illustrating an oscillator.

In FIG. 1, for example, because a plastic wrapping material 10 is continuously moving in the direction of an arrow 13 along and above a metal bed 12 affixed on a base 11, the wrapping material 10 and metal bed 12 are in a relative motion relationship. A moveable hammer 14, which is positioned in an area above the metal bed 12, oscillates up and down in accordance with the operation of an ultrasonic vibrator 15, and applies impacts to the wrapping material 10. As a result, overlapped two sheets of the wrapping material 10 are fusion-bonded by internally generated heat. Used as the above-mentioned ultrasonic vibrator 15 is, for example, a magnetostrictive oscillator connecting a coil 50 to a power circuit 51 as shown in FIG. 2.

There is nothing novel about the circuit 20 which oscillates the ultrasonic vibrator 15. It may be formed, for example, by a rectifying and smoothing circuit 16 and a control voltage 17, or an oscillator circuit 18 and a control circuit 19, all of which are connected to a power source 26. The hammer 14 applies impacts to the wrapping material 10 at a fixed frequency and amplitude. As a result, the overlapped two sheets of the wrapping material is fusion-bonded by the friction heat. In this case, when command information is inputted to a control unit 22 by an input unit 21, a variable-voltage device 25 is operated by a signal 24 generated from a controller 23 provided in the control unit 22, and the amplitude of the hammer 14 is controlled in accordance with an adjusted current value. In other words, in a case in which the temperature generated in the wrapping material 10 is set at 150° C., when information on thickness and properties of the wrapping material is inputted to the control unit 22 from the input unit 21, the control unit 22 changes the setting of the amplitude value of the hammer 14 in correspond to the temperature value.

As a novel control, the constitution is such that a temperature sensor of a non-contact type, such as an infrared thermo-sensitive system, is installed to face a rear corner of the hammer 14 in the movement direction of the wrapping material 10 and, in addition, a heat signal received by the sensor 30 is sent to the variable-voltage device 25 through the control unit 22 and controller 23.

Figure 3:
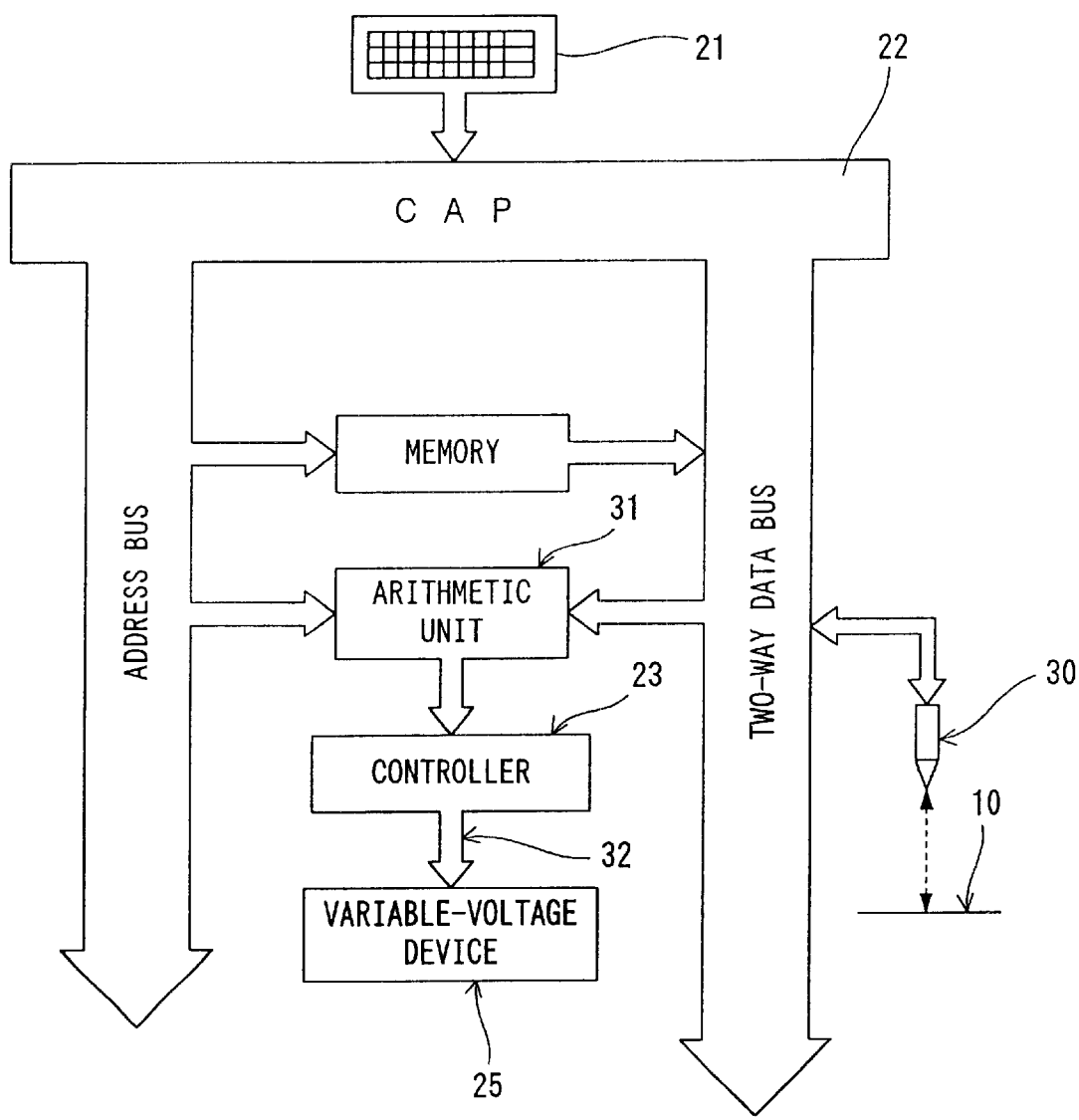
FIG. 3 is a diagram illustrating a control unit.

However, because of the change in thickness of the wrapping material which is heated by the vibrations given by a hammer 14 while being in relative motion with the hammer, the generated temperature in the wrapping material will also change. In a case like this, as in FIG. 3, the sensor 30, which measures the surface temperature of the wrapping material 10 immediately after the vibration heat is generated, continuously sends thus measured values to the control unit 22. As a result, the control unit 22 continuously returns a correction signal 32 to the variable-voltage device 25 through an arithmetic unit 31 and the controller 23, so that the amplitude of the hammer 14 is corrected in accordance with the change in thickness of the wrapping material 10, and the generated temperature of the wrapping material 10 is made constant. It should be noted that the same holds true even when the properties of the wrapping material 10 change.

What is claimed is:

1. A method for controlling fusion-bonding temperature of a wrapping material, comprising the steps of:

in ultrasonic sealing means comprising a wrapping material (10) and a sealing hammer (14) that are in relative motion, an ultrasonic vibrator (15) which actuates the sealing hammer (14) and applies an impact to the wrapping material (10) via said sealing hammer (14), and an electric circuit (20) for applying oscillating power to said ultrasonic vibrator (15), measuring by a non-contact-type temperature sensor (30), in the vicinity of said sealing hammer (14), the fusion-bonding temperature of the wrapping material (10) which is heated by continuous impacts of the sealing hammer (14);

sending, to a variable-voltage device (25) for a power source (26) for said electric circuit (20), output signals (24) corresponding to measured temperatures being successively inputted to a control unit (22) from the temperature sensor (30); and controlling, with said variable-voltage device (25), an amplitude of said moveable hammer (14) in accordance with said measured temperature value, so as to make uniform the heating temperature of the wrapping material (10).

2. An apparatus for controlling fusion-bonding temperature of a wrapping material, in which ultrasonic sealing means comprises a wrapping material (10) and a sealing hammer (14) that are in relative motion, an ultrasonic vibrator (15) which actuates the sealing hammer (14) and applies an impact to the wrapping material (10) via said sealing hammer (14), and an electric circuit (20) for applying oscillating power to said ultrasonic vibrator (15), said apparatus comprising:

a non-contact-type temperature sensor (30) for measuring, in the vicinity of the sealing hammer (14), the fusion-bonding temperature of the wrapping material (10) which is heated by continuous impacts of the sealing hammer (14);

a control unit (22) for continuously computing output signals for control corresponding to the temperature values measured by said temperature sensor (30); and means for sending output signals (24) from said control unit (22) to a variable-voltage device (25) for a power source (26) for said electric circuit (20), and controlling an amplitude of said moveable hammer (14) with said variable-voltage device (25), so as to make uniform the heating temperature of the wrapping material (10).

* * * * *